United States Patent
Hales et al.

(10) Patent No.: US 9,061,701 B2
(45) Date of Patent: Jun. 23, 2015

(54) DYNAMIC SYSTEM COMPENSATOR FOR ACTIVELY CONTROLLED POWER STEERING SYSTEMS

(75) Inventors: Michael K. Hales, Midland, MI (US); Anthony J. Champagne, Saginaw, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 623 days.

(21) Appl. No.: 13/173,043

(22) Filed: Jun. 30, 2011

(65) Prior Publication Data

US 2012/0004807 A1   Jan. 5, 2012

Related U.S. Application Data

(60) Provisional application No. 61/360,808, filed on Jul. 1, 2010.

(51) Int. Cl.
*B62D 6/00* (2006.01)
*B62D 5/04* (2006.01)

(52) U.S. Cl.
CPC ............ *B62D 5/0472* (2013.01); *B62D 5/0481* (2013.01); *B62D 6/00* (2013.01); *B62D 5/0457* (2013.01); *B62D 5/0463* (2013.01)

(58) Field of Classification Search
CPC .. B62D 5/0457; B62D 5/0463; B62D 5/0472; B62D 5/0481; B62D 5/005; B62D 6/00; B62D 6/004; B62D 6/006; B62D 6/008; B60W 2050/0054
USPC ..................................................... 701/41–44
See application file for complete search history.

(56) References Cited

U.S. PATENT DOCUMENTS

| | | | | |
|---|---|---|---|---|
| 5,389,867 A | * | 2/1995 | Adachi et al. | 318/601 |
| 7,004,280 B2 | * | 2/2006 | Shirato et al. | 180/446 |
| 7,574,294 B2 | * | 8/2009 | Ta et al. | 701/41 |
| 7,873,453 B2 | * | 1/2011 | Kobayashi et al. | 701/41 |
| 8,116,944 B2 | * | 2/2012 | Hales et al. | 701/41 |
| 8,626,394 B2 | * | 1/2014 | Kezobo et al. | 701/41 |

(Continued)

FOREIGN PATENT DOCUMENTS

| | | |
|---|---|---|
| CN | 15047372 A | 6/2004 |
| CN | 1769122 A | 5/2006 |

(Continued)

OTHER PUBLICATIONS

English Translation of Chinese Search Report; Chinese Application No. 201110222971.7; Filing Date: Jul. 1, 2011; Dated: Nov. 5, 2012; 3 pages.

(Continued)

*Primary Examiner* — Jack W Keith
*Assistant Examiner* — Chuong P Nguyen
(74) *Attorney, Agent, or Firm* — Cantor Colburn LLP

(57) ABSTRACT

A control method for an electric power steering system is provided. The method includes providing a power steering control signal; providing a disturbance cancel command; varying at least one filter based on a frequency of the disturbance cancel command; applying the at least one varied filter to the disturbance cancel command to generate a compensation signal; applying the compensation signal to the power steering control signal to generate a compensated control signal; and controlling the power steering system based on the compensated control signal.

19 Claims, 8 Drawing Sheets

(56) References Cited

U.S. PATENT DOCUMENTS

| | | | |
|---|---|---|---|
| 2003/0120404 A1* | 6/2003 | Endo ............................... | 701/41 |
| 2004/0245041 A1* | 12/2004 | Fukuda et al. ................ | 180/444 |
| 2006/0080016 A1* | 4/2006 | Kasahara et al. ............. | 701/41 |
| 2006/0106516 A1* | 5/2006 | Pick et al. ...................... | 701/41 |
| 2007/0029129 A1* | 2/2007 | Shiozawa et al. ............. | 180/446 |
| 2008/0308342 A1* | 12/2008 | Nishimori et al. ............ | 180/446 |
| 2009/0157258 A1* | 6/2009 | Hales et al. .................... | 701/41 |
| 2009/0192679 A1* | 7/2009 | Kobayashi et al. ............ | 701/42 |
| 2010/0268422 A1* | 10/2010 | Blommer et al. .............. | 701/44 |
| 2013/0131926 A1* | 5/2013 | Champagne et al. .......... | 701/42 |

FOREIGN PATENT DOCUMENTS

| | | | |
|---|---|---|---|
| EP | 2100797 | A1 | 9/2000 |
| EP | 1884447 | A1 | 2/2008 |
| EP | 2028080 | A1 | 2/2009 |
| EP | 2113444 | A2 | 4/2009 |
| EP | 2113444 | A3 | 4/2010 |

OTHER PUBLICATIONS

Chinese Search Report; Chinese Application No. 2011102229717; Filing Date: Jul. 1, 2011; Dated: Nov. 5, 2012; 2 pages.

English Translation of Chinese Office Action for CN Application No. CN201110222971.7, dated: Jul. 8, 2013; 3 pages.

Chinese Office Action for CN Application No. 201110222971.7, dated: Jul. 8, 2013; 8 pages.

European Search Report, European Application No. 11005323.8; European Filing Date: May 15, 2012; Date of Mailing: May 24, 2012, 7 pages.

\* cited by examiner

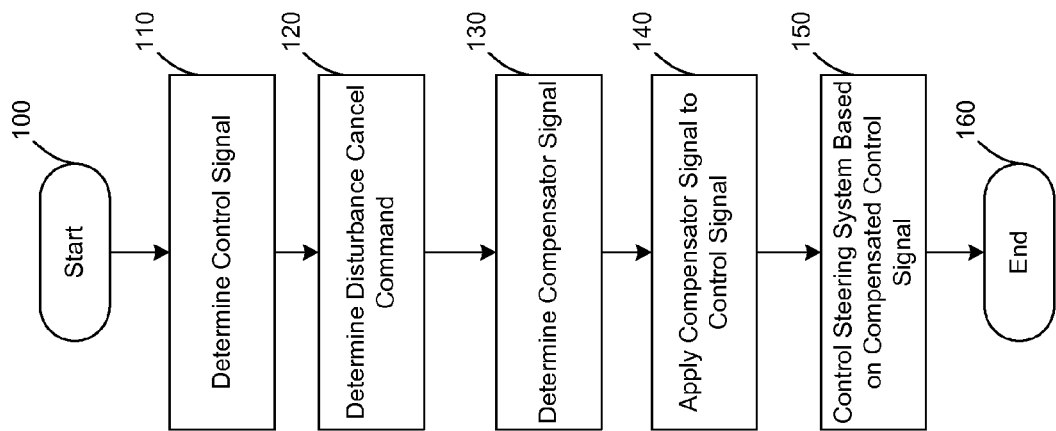

DYNAMIC SYSTEM COMPENSATOR FOR ACTIVELY CONTROLLED POWER STEERING SYSTEMS

CROSS-REFERENCES TO RELATED APPLICATIONS

This patent application claims priority to U.S. Provisional Patent Application Ser. No. 61/360,808 filed Jul. 1, 2010 which is incorporated herein by reference in its entirety.

FIELD OF THE INVENTION

The subject invention relates to a dynamic system compensator for actively controlled power steering systems, and more particularly to a method that compensates for the dynamic response of the physical system.

BACKGROUND

Actively controlled power steering systems are designed to assist a driver while steering a vehicle. Additional features are provided to create an acceptable steering feel response. For such systems many algorithms have been developed to accomplish these objectives, acting across a range of operating frequencies typically from 0 to 30 Hz. For some algorithms designed to operate at higher frequencies, typically above 5 Hz, it has been observed that the performance of the algorithm does not always meet expectations. One reason for this limitation is the dynamic behavior inherent in the physical design of the system.

Accordingly, it is desirable to provide methods and systems that compensate for the dynamic response of the physical system of a vehicle.

SUMMARY OF THE INVENTION

In one exemplary embodiment of the present invention a control method for an electric power steering system is provided. The method includes providing a power steering control signal; providing a disturbance cancel command; varying at least one filter based on a frequency of the disturbance cancel command; applying the at least one varied filter to the disturbance cancel command to generate a compensation signal; applying the compensation signal to the power steering control signal to generate a compensated control signal; and controlling the power steering system based on the compensated control signal.

In another exemplary embodiment of the present invention, a system for modifying the steering response in an electric power steering system is provided. The system includes a power steering system. The system further includes a control module that controls a motor of the power steering system based on a control method. The control method includes: providing a power steering control signal; providing a disturbance cancel command; varying at least one filter based on a frequency of the disturbance cancel command; applying the at least one varied filter to the disturbance cancel command to generate a compensation signal; applying the compensation signal to the power steering control signal to generate a compensated control signal; and controlling the power steering system based on the compensated control signal.

In yet another exemplary embodiment of the present invention, a control system for a power steering system is provided. The control system includes a power steering control signal module that generates a control signal. A disturbance rejection module generates a disturbance cancel command. A compensator module varies at least one filter based on a frequency of the disturbance cancel command, applies the at least one filter to the disturbance cancel command, and applies the filtered disturbance cancel command to the control signal to generate a compensated control signal.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which:

FIG. 8 is a flowchart illustrating a compensator method in accordance with exemplary embodiments.

DESCRIPTION OF THE EMBODIMENTS

Figure 1:
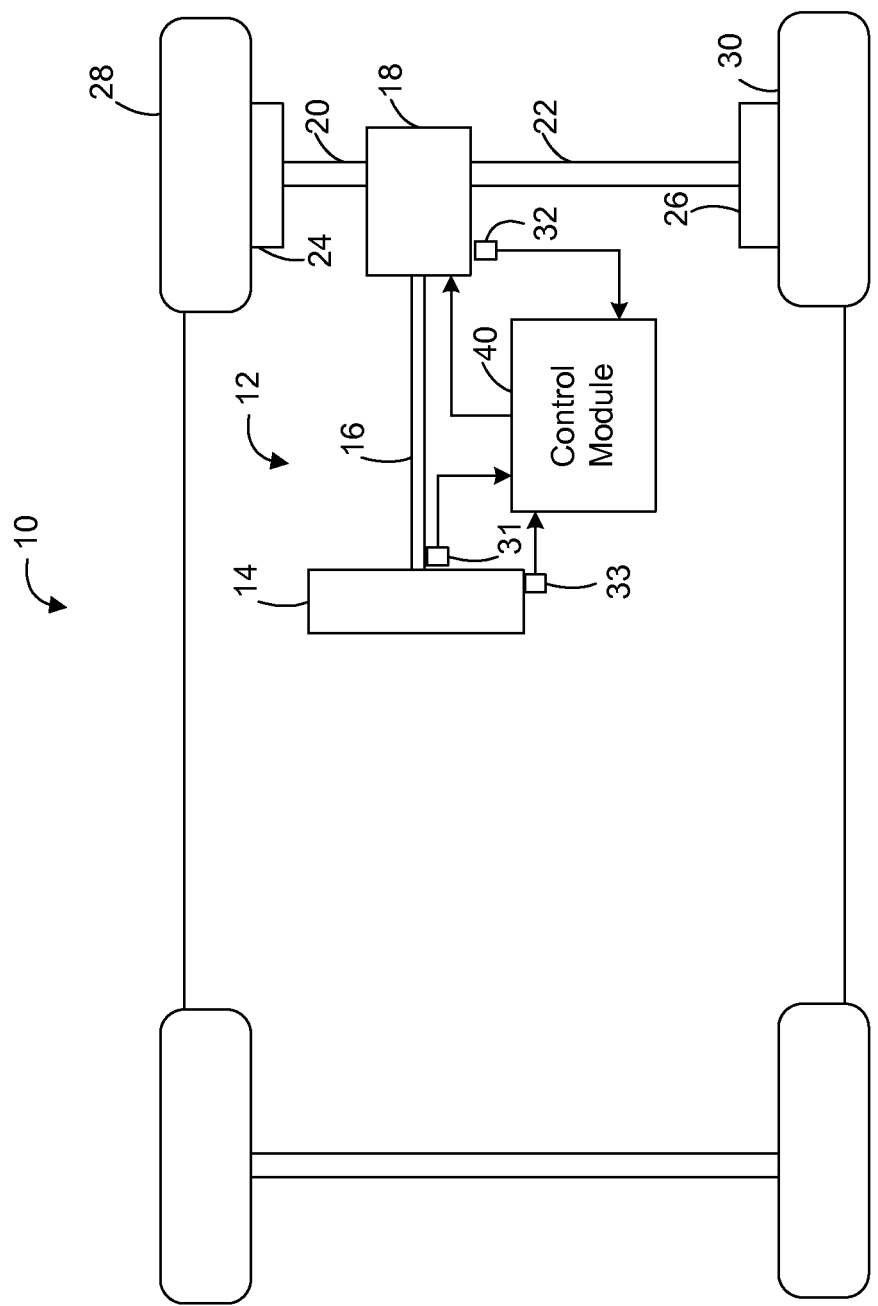
FIG. 1 is a schematic diagram of an electric power steering system in accordance with exemplary embodiments.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting same, an exemplary embodiment of a vehicle 10 including a steering system 12 is illustrated. In various embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10. Although an EPS system is illustrated in FIG. 1 and described herein, it is appreciated that the steering system 12 of the present disclosure can include various controlled steering systems including, but not limited to, steering systems with hydraulic configurations, and steer by wire configurations.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In various embodiments, the sensors 31, 32, 33 can include, for example, a load sensor, a driver torque sensor, and/or a position sensor.

In various embodiments, a control module 40 controls the operation of the steering system 12 and/or the vehicle 10 based on one or more of the sensor signals and further based on the compensation systems and methods of the present disclosure. Generally speaking, the compensation systems and methods of the present disclosure measure or calculate the dynamic response of the steering system 12 and modify command signals to the steering system 12 such that desired results are achieved. In various embodiments, the compensation systems and methods can modify a rack disturbance cancel command in such a way that when applied to a torque signal, controls the motor in a desired manner, to counteract rack disturbance.

Shown and described herein are various non-limiting embodiments of the invention. The embodiments are specific to achieving a desired result with regard to the steering rack and pinion of the steering assist unit 18, for example, by rejecting disturbances to the steering rack and pinion due to wheel imbalance. As can be appreciated, while not shown here, the compensator systems and methods can also be made variable based on other power system features and/or variables. Some non-limiting examples can include hand wheel torque, motor angle, motor velocity, vehicle speed, motor torque, motor current, and motor voltage.

Figure 2:
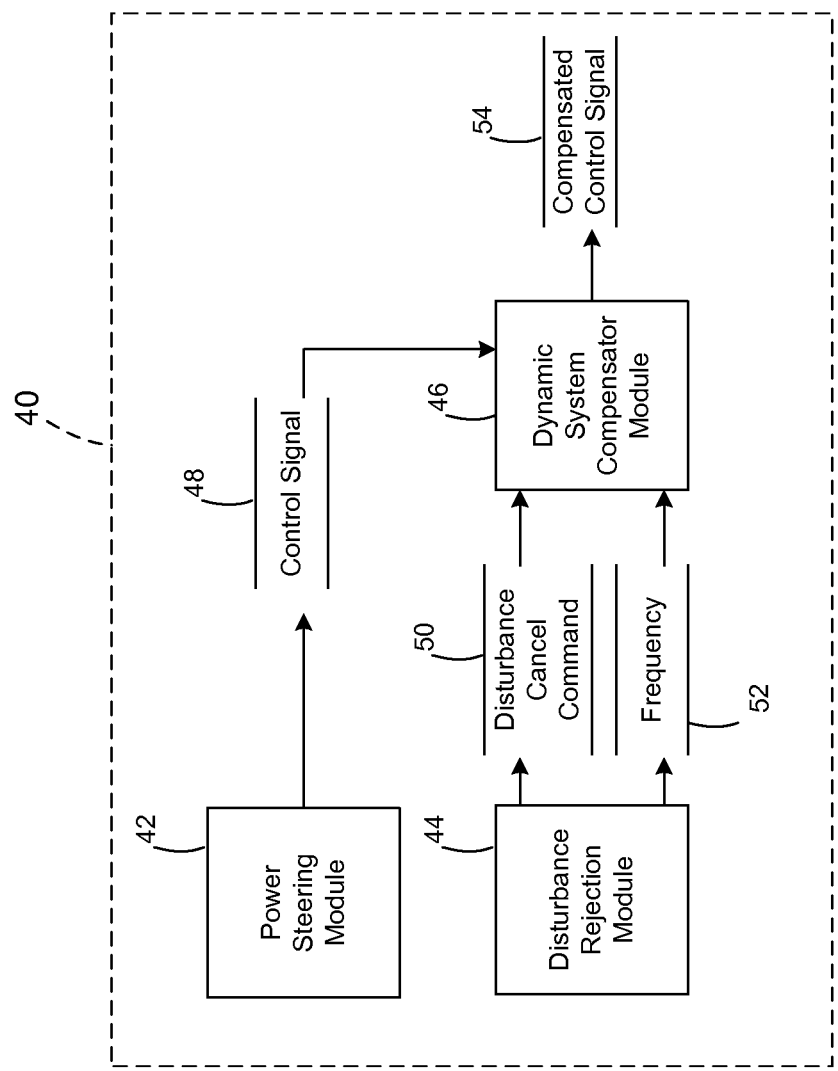
FIG. 2 is a dataflow diagram illustrating a control module of the power steering system in accordance with exemplary embodiments.

Referring now to FIG. 2 where a dataflow diagram illustrates exemplary embodiments of the control module 40 of FIG. 1 used to control the steering system 12 of FIG. 1. In various embodiments, the control module 40 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIGS. 2 through 8 can be combined and/or further partitioned to similarly reduce steering torque variation. As can be appreciated, the sub-modules shown in FIG. 2 can be implemented as a single control module 40 (as shown) or multiple control modules (not shown). Inputs to the control module 40 can be generated from the sensors 31, 32, 33 (FIG. 1) of the vehicle 10 (FIG. 1), can be modeled within the control module 40 (e.g., by other sub-modules (not shown)), can be received from other control modules (not shown), and/or can be predefined.

In various embodiments, the control module 40 includes a power steering module 42, a disturbance rejection module 44, and a dynamic system compensator module 46. The power steering module 42 performs control methods commonly performed in electric power steering systems such as, but not limited to, assist methods, stability compensation methods, and damping methods. Depending on the control method, the output can be a control signal 48 requesting a motor torque, a motor voltage, or a motor current. The disturbance rejection module 44 determines a disturbance force acting on the steering rack of the steering assist unit 18 (FIG. 1), for example, and generates a rack disturbance cancel command 50 and a frequency 52 of the command 50.

The dynamic system compensator module 46 receives as input the rack disturbance cancel command 50, the frequency 52, and the control signal 48. The dynamic system compensator module 46 determines a compensation signal based on a dynamic response that the rack disturbance cancel command 50 would have on the steering system 12 (FIG. 1). For example, because of physical inertias, damping and compliances, the response between the rack disturbance cancel command 50 and the corresponding effect it has on the rack is dynamic. This dynamic response may have various levels of effects, depending upon the specific system design. The dynamic system compensator module 46 applies the compensation signal to the control signal 48. For example, the dynamic system compensator module 46 adds the compensation signal to the control signal 48 and generates a compensated control signal 54 for controlling the steering system 12 (FIG. 1).

Figure 3:
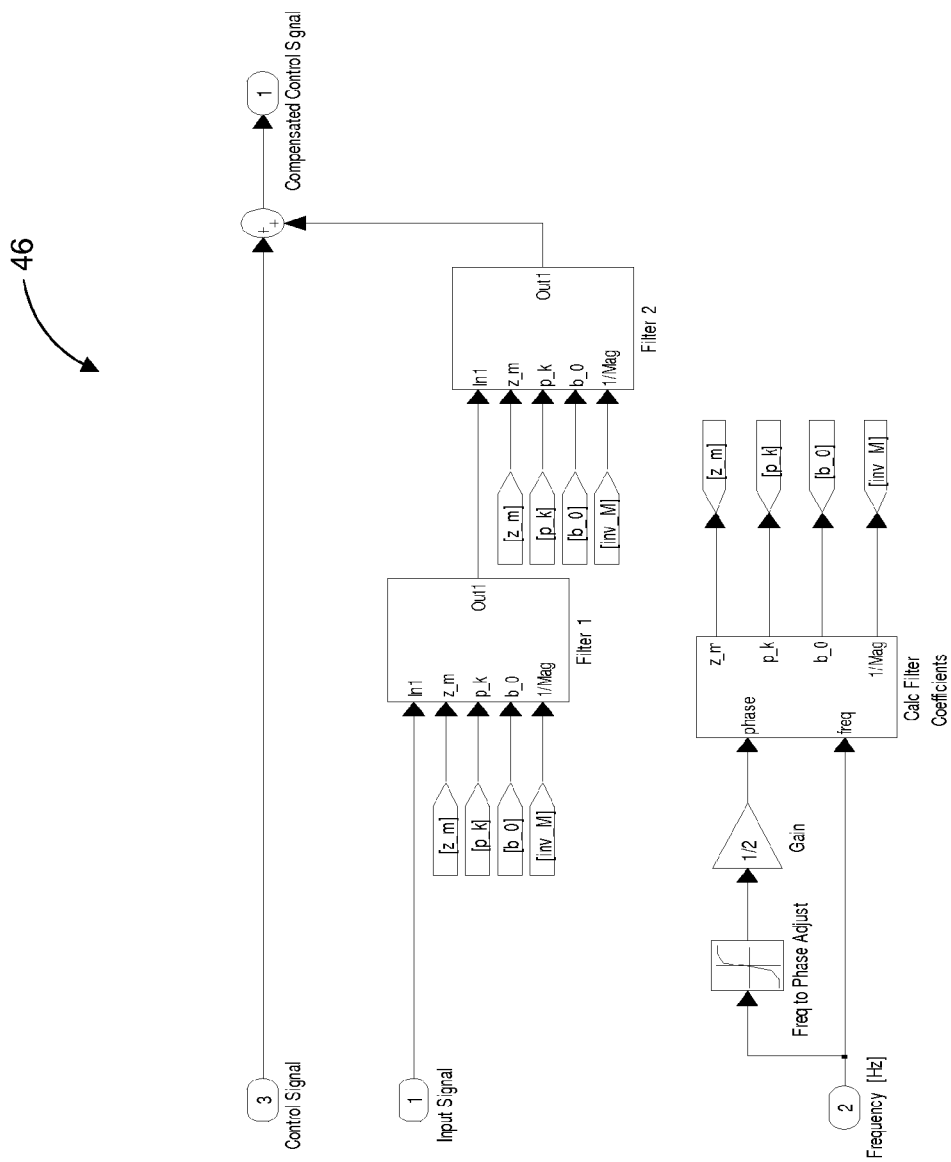
FIGS. 3 through 7 are block diagrams illustrating a compensator system and methods in accordance with exemplary embodiments.

FIGS. 3 through 7 illustrate exemplary embodiments of logic that can be implemented in the dynamic system compensator module 46. As shown in FIG. 3, the input signal can be filtered twice by two cascaded compensators, Filter 1 and Filter 2. Each compensator can be designed to provide specified phase lead or lag up to a limit. In order to achieve lead or lag beyond the limits, the two compensators are provided together.

Figure 4:
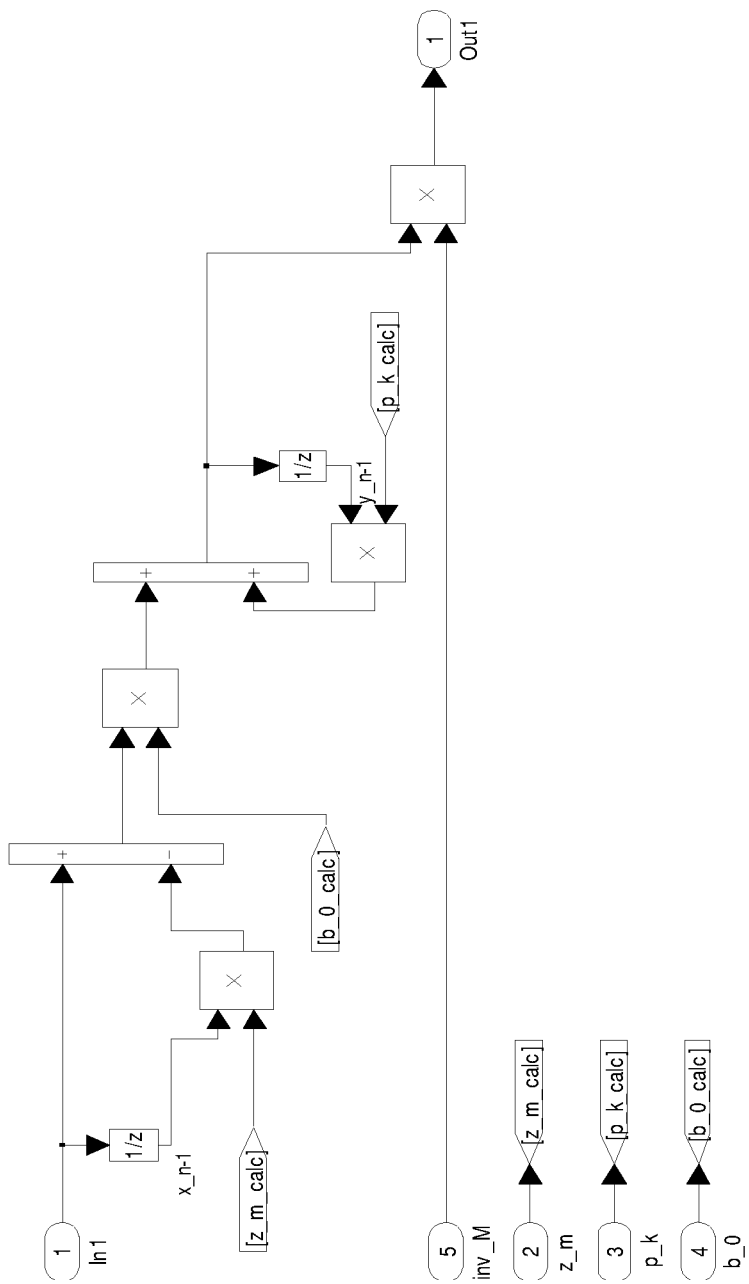

FIG. 4 illustrates exemplary logic of the Filter 1 and/or Filter 2 blocks. The filters can be phase lead or phase lag filters using filter coefficients z_m, p_k, and b_0, and an inverse magnitude inv_M Referring back to FIG. 3, the block Calc Filter Coefficients provides the filter coefficients z_m, p_k, and b_0, as well as the inverse magnitude inv_M to the Filter 1 and/or Filter 2. In various embodiments, the parameters are made dependent on other power steering variables, namely, frequency. Frequency specifies the frequency to provide the phase adjustment. The block Freq to Phase Adjust allows varying the phase based on the disturbance cancel command frequency. The ½ gain that follows divides the specified phase by two since this structure utilizes cascaded compensators.

Figure 5:
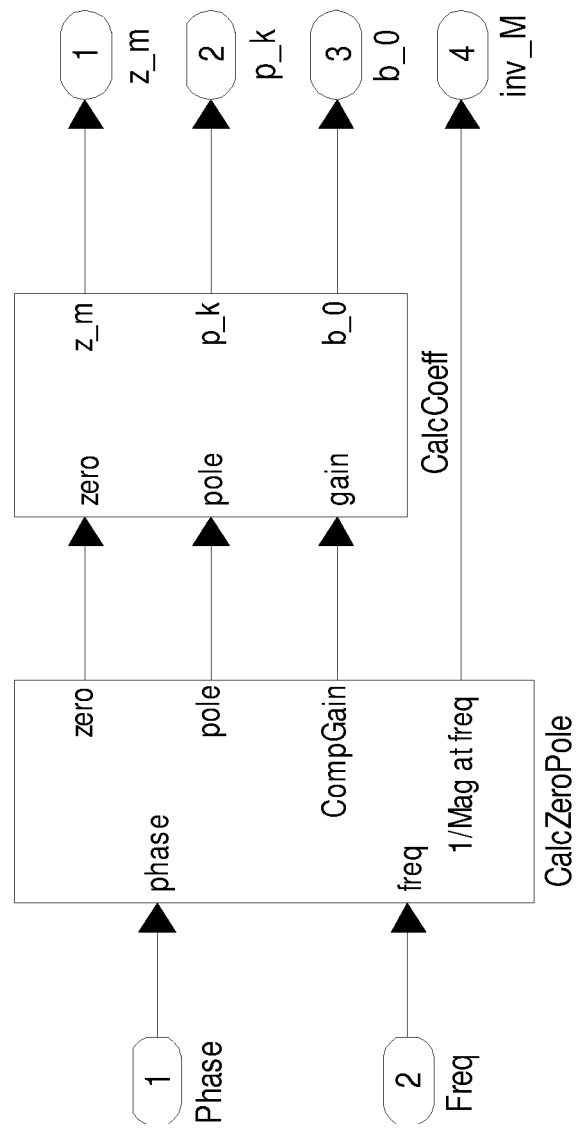

The block Calc Filter Coefficients of FIG. 3 is shown in more detail in FIG. 5. In various embodiments, the compensator with a continuous-time transfer function $H_c$ is represented as follows:

$$H_c(s) = K * \frac{s + \text{zero}}{s + \text{pole}}. \tag{1}$$

K is used to achieve the desired DC gain, and specification of zero and pole provide the desired phase lead or lag at the desired frequency. Calculations of zero, pole, and gain are performed in the CalcZeroPole block. This block also provides an additional output, 1/Mag at freq. For this embodiment, it is desired to adjust only the phase, not amplitude, of the signal. This compensator structure provides a non-unity gain at the phase adjusted frequency. Therefore the gain is calculated and provided as an output.

In various embodiments, to implement the continuous-time transfer function above in a digital controller, an equivalent discrete-time transfer function can be defined as follows by $H_d$:

$$H_d(z) = b_0 * \frac{1 - z_m * z^{-1}}{1 - p_k * z^{-1}}. \tag{2}$$

Figure 6:
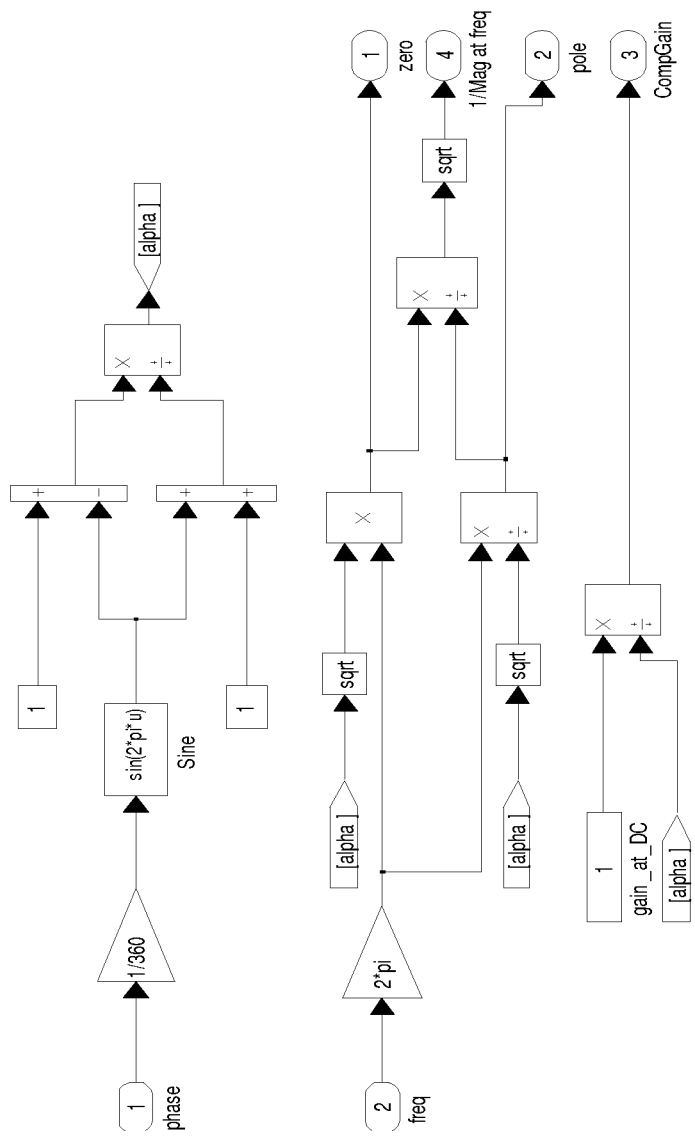
Figure 7:
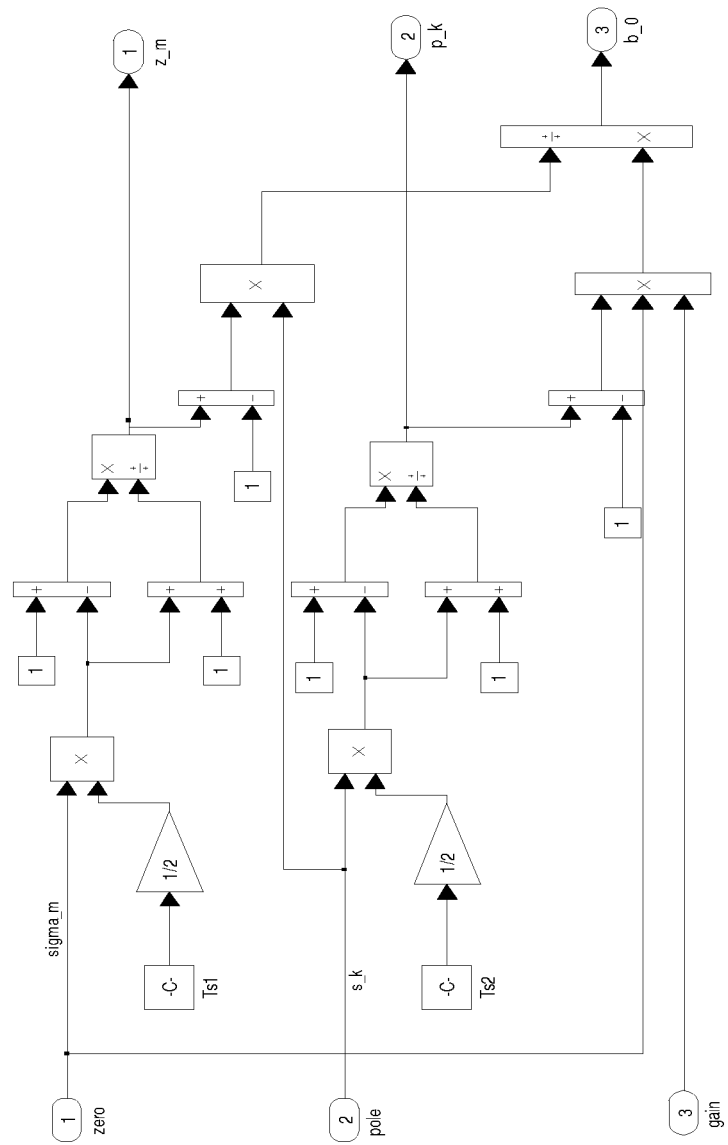

Calculations of z_m, p_k, and b_0 are performed in the CalcCoeff block using pole-zero mapping with the bilinear transformation. FIGS. 6 and 7 illustrate the block CalcZeroPole and the block CalcCoeff in more detail, respectively.

Referring now to FIG. 8, and with continued reference to FIGS. 1 and 2, a flowchart illustrates a compensation method that can be performed by the control module 40 of FIG. 1 in accordance with the present disclosure. As can be appreciated in light of the disclosure, the order of operation within the method is not limited to the sequential execution as illustrated in FIG. 8, but may be performed in one or more varying orders as applicable and in accordance with the present disclosure.

In various embodiments, the method can be scheduled to run based on predetermined events, and/or run continually during operation of the steering system.

In one example, the method may begin at 100. The control signal 48 is determined at 110, for example, based on the control methods discussed above. The rack disturbance cancel command 50 is determined at 120, for example as discussed above. The compensator signal is determined at 130, for example based on the logic provided in FIGS. 3-7. The compensator signal is applied to the control signal 48 at 140 to generate the compensated control signal 54. The compensated control signal 54 controls the power steering system 12 (FIG. 1) at 150. Thereafter, the method may end at 160.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A control method for an electric power steering system, comprising:
   providing a power steering control signal;
   providing a disturbance cancel command based on a rack disturbance;
   varying at least one filter based on a frequency of the disturbance cancel command;
   applying the at least one varied filter to the disturbance cancel command to generate a compensation signal based on a response to the disturbance cancel command from the steering system;
   applying the compensation signal to the power steering control signal to generate a compensated control signal; and
   controlling the power steering system to generate a desired assist torque based on the compensated control signal.

2. The method of claim 1, wherein the varying comprises varying a first filter and a second filter based on the frequency of the disturbance cancel command.

3. The method of claim 2, wherein the first filter and the second filter are the same filter design.

4. The method of claim 3, wherein the applying the first filter and the second filter comprises applying the first filter to the disturbance cancel command and applying the second filter to the filtered disturbance cancel command.

5. The method of claim 1, wherein the varying the at least one filter comprises varying the at least one filter to modify a signal phase.

6. The method of claim 1, wherein the applying the compensation signal to the power steering control signal comprises adding the compensation signal to the power steering control signal.

7. The method of claim 1, wherein the steering system comprises a rack that responds to the disturbance cancel command.

8. A system for modifying a steering response in an electric power steering system comprising:
   a power steering system; and
   a control module configured to control a motor of the power steering system based on a control method, the control method comprising:
   providing a power steering control signal;
   providing a disturbance cancel command;
   varying a first filter and a second filter based on a frequency of the disturbance cancel command;
   applying the first varied filter to the disturbance cancel command and applying the second filter to the filtered disturbance cancel command to generate a compensation signal;
   applying the compensation signal to the power steering control signal to generate a compensated control signal; and
   controlling the power steering system to generate a desired assist torque based on the compensated control signal.

9. The system of claim 8, wherein the first filter and the second filter are the same filter.

10. The system of claim 8, wherein the varying the first and second filters comprises varying the first and second filters to modify a signal phase.

11. The system of claim 8, wherein the applying the compensation signal to the power steering control signal comprises adding the compensation signal to the power steering control signal.

12. The system of claim 8, wherein the providing a disturbance cancel command is based on a rack disturbance.

13. A control system for a power steering system, comprising:
   a power steering control signal module configured to generate a control signal;
   a disturbance rejection module configured to generate a disturbance cancel command; and
   a compensator module configured to generate a compensated control signal by:
   varying at least one filter based on a frequency of the disturbance cancel command that counteracts a rack disturbance;
   applying the at least one filter to the disturbance cancel command based on a response to the disturbance cancel command from the steering system;
   applying the filtered disturbance cancel command to the control signal; and
   controlling the power steering system to generate a desired assist torque based on the compensated control signal.

14. The control system of claim 13, wherein the compensator module is configured to vary a first filter and a second filter based on the frequency of the disturbance cancel command.

15. The control system of claim 14, wherein the first filter and the second filter are the same filter design.

16. The control system of claim 13, wherein the varying the at least one filter comprises varying the at least one filter to modify a signal phase.

17. The control system of claim 13, wherein the applying the filtered disturbance cancel command to the power steering control signal comprises adding a compensation signal to the power steering control signal, wherein the compensator module is configured to generate the compensation signal by applying the at least one filter to the disturbance cancel command.

18. The control system of claim 13, wherein the disturbance rejection module is configured to generate a disturbance cancel command based on a rack disturbance.

19. The control system of claim 13 further comprising a rack that responds to the disturbance cancel command.

* * * * *